(12) United States Patent
Bolourchi et al.

(10) Patent No.: US 6,926,114 B2
(45) Date of Patent: Aug. 9, 2005

(54) ASSIST MODIFICATION IN ACTIVE FRONT STEERING

(75) Inventors: Farhad Bolourchi, Novi, MI (US); Karen A. Boswell, Freeland, MI (US); John E. Dickinson, Brighton, MI (US); John D. Martens, New Hudson, MI (US); Edward J. Bednar, Brighton, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/426,758

(22) Filed: Apr. 30, 2003

(65) Prior Publication Data

US 2003/0221900 A1 Dec. 4, 2003

Related U.S. Application Data

(60) Provisional application No. 60/385,308, filed on Jun. 3, 2002, provisional application No. 60/385,329, filed on Jun. 3, 2002, provisional application No. 60/385,328, filed on Jun. 3, 2002, and provisional application No. 60/385,284, filed on Jun. 3, 2002.

(51) Int. Cl.$^7$ ................................................ B62D 5/04
(52) U.S. Cl. ...................................... 180/422; 180/446
(58) Field of Search ................................ 180/402, 403, 180/415, 422, 423, 426, 421, 446, 444

(56) References Cited

U.S. PATENT DOCUMENTS

| | | | |
|---|---|---|---|
| 4,871,040 A | 10/1989 | Zuraski et al. ............... 180/142 |
| 4,932,492 A | 6/1990 | Sauvageot et al. .......... 180/79.1 |
| 5,050,697 A | * 9/1991 | Umemura .................... 180/422 |
| 5,285,867 A | * 2/1994 | Pedersen et al. ............. 180/321 |
| 5,704,446 A | 1/1998 | Chandy et al. ............. 180/446 |
| 6,205,371 B1 | 3/2001 | Wolter-Doll ................ 700/174 |
| 6,547,031 B1 | 4/2003 | Magnus |
| 6,568,499 B2 | * 5/2003 | Nakazawa et al. ........... 180/422 |
| 6,575,265 B2 | * 6/2003 | Richardson et al. ......... 180/444 |
| 6,678,594 B2 | * 1/2004 | Byers et al. .................. 701/41 |
| 6,681,881 B2 | * 1/2004 | Andonian et al. ........... 180/402 |
| 2003/0146038 A1 | * 8/2003 | Mills et al. .................. 180/422 |

OTHER PUBLICATIONS

SAE Technical Paper Series; 1999–01–0395; Improvement in Driver–Vehicle System Performance by Varying Steering Gain with Vehicle Speed and Steering Angle: VGS (Variable Gear–Ratio Steering System); International Congress and Exposition, Detroit, MI; Mar. 1–4, 1999; pp. 117–126.

* cited by examiner

*Primary Examiner*—Avraham Lerner
(74) *Attorney, Agent, or Firm*—Michael D. Smith

(57) ABSTRACT

Disclosed herein in an exemplary embodiment is a method for providing variable assist in an active steering system of a vehicle. The method comprises: receiving an input signal that includes at least one of, a variable ratio command signal, a stability command signal, a hand wheel position signal, a vehicle speed signal indicative of a speed of the vehicle, a signal indicative of an operator selected function, and a signal indicative a vehicle operating mode. The method also comprises: generating an assist command to an assist mechanism responsive to the input signal wherein the assist mechanism is operatively coupled to the differential actuator and a road wheel of the steering system to provide an assist torque responsive to the motion of the output shaft. The active steering system includes a hand wheel operatively coupled to an input of a differential actuator and a motor operatively coupled to the differential actuator. The differential actuator is configured to translate motion of the input into motion of the output shaft, where the motion of the output shaft is further responsive to the motor and wherein the output shaft is coupled to the road wheel of the steering system.

20 Claims, 3 Drawing Sheets

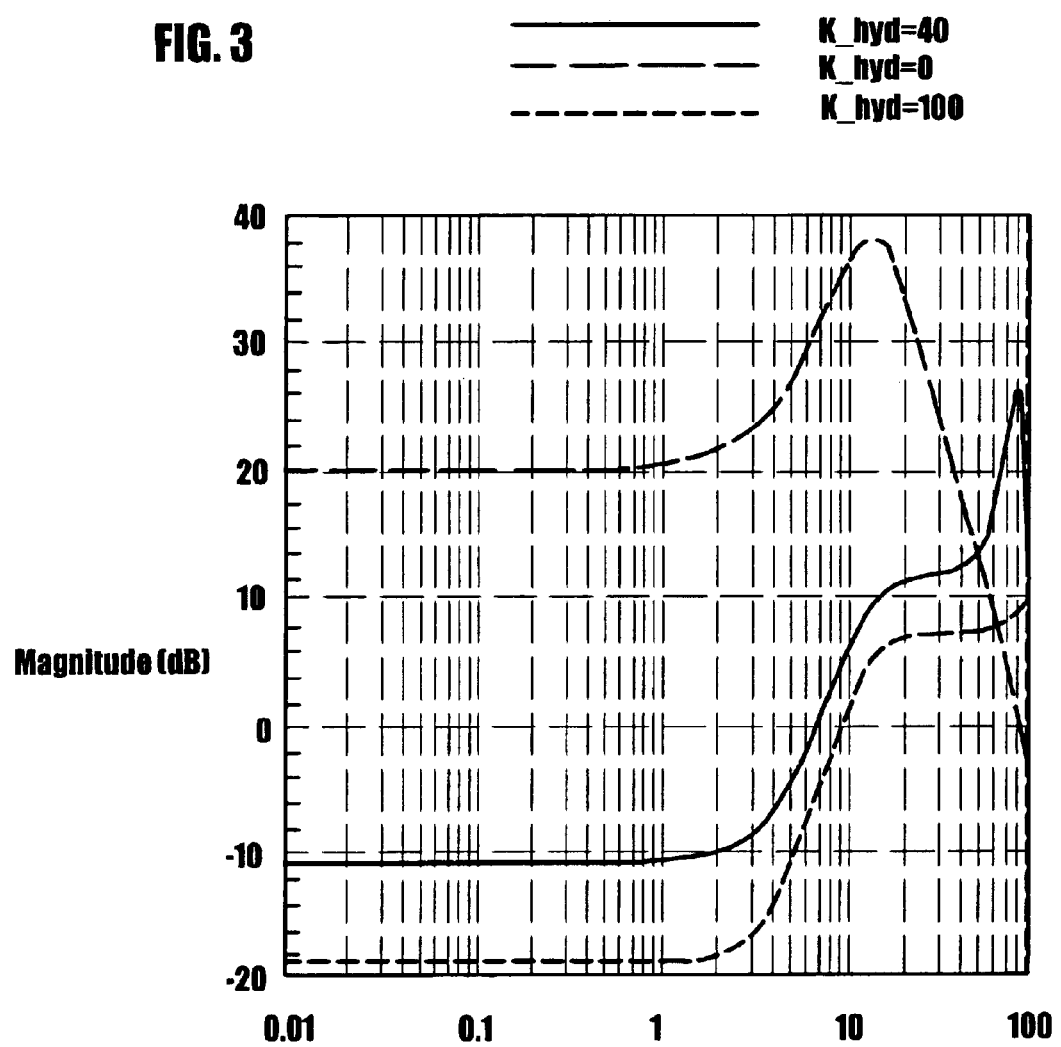

ASSIST MODIFICATION IN ACTIVE FRONT STEERING

CROSS-REFERENCE TO RELATED APPLICATIONS

This application claims the benefit of: U.S. Provisional Patent Application No. 60/385,308, filed Jun. 03, 2002; U.S. Provisional Patent Application No. 60/385,329, filed Jun. 03, 2002; U.S. Provisional Patent Application No. 60/385,328, filed Jun. 03, 2002; and U.S. Provisional Patent Application No. 60/385,284, filed Jun. 03, 2002 the contents of which are incorporated by reference herein in their entirety.

BACKGROUND

Conventional vehicular steering systems have an articulated mechanical linkage connecting an input device (e.g., steering wheel or hand-wheel) to a steering actuator (e.g., steerable road wheel). Even with power assisted steering in an automobile, for example, a typical hand-wheel motion directly corresponds to a resulting motion of the steerable road wheels, substantially unaffected by any assist torque.

However, for a vehicular steering system with active steering, such as that used in an automotive front-controlled steering system, a given motion of the hand-wheel may be supplemented by an additional motion, such as that from a differential steering actuator, which translates into a motion of the steerable road wheels that does not necessarily correspond to the given motion of the hand-wheel. Consequently, when the differential steering actuator is inactive, the motion of the steerable road wheels directly corresponds to the hand-wheel motion due to the articulated mechanical linkage, just as in conventional systems.

The term "active steering" relates to a vehicular control system, which generates an output that is added to or subtracted from the front steering angle, wherein the output is typically responsive to the yaw and/or lateral acceleration of the vehicle. It is known that, in some situations, an active steering control system may react more quickly and accurately than an average driver to correct transient handling instabilities. In addition, active steering can also provide for variable steering ratios in order to reduce driver fatigue while improving the feel and responsiveness of the vehicle. For example, at very low speeds, such as that which might be experienced in a parking situation, a relatively small rotation of the hand-wheel may be supplemented using an active steering system in order to provide an increased steering angle to the steerable road wheels.

Conventional hydraulic and electric power-assisted steering systems generally lack an active element for providing control over the steering angle independent of a driver's input. This is because prior attempts at adding such an active element have not integrated well with existing systems and/or create too much torque feedback to the driver during active steering control. Therefore, it can be appreciated that there is a need for a tunable assist capability integrated with active steering.

SUMMARY

Disclosed herein in an exemplary embodiment is a method for providing variable assist in an active steering system of a vehicle. The method comprises: receiving an input signal that includes at least one of, a variable ratio command signal, a stability command signal, a hand wheel position signal, a vehicle speed signal indicative of a speed of the vehicle, a signal indicative of an operator selected function, and a signal indicative a vehicle operating mode. The method also comprises: generating an assist command to an assist mechanism responsive to the input signal wherein the assist mechanism is operatively coupled to the differential actuator and a road wheel of the steering system to provide an assist torque responsive to the motion of the output shaft. The active steering system includes a hand wheel operatively coupled to an input of a differential actuator and a motor operatively coupled to the differential actuator. The differential actuator is configured to translate motion of the input into motion of the output shaft, where the motion of the output shaft is further responsive to the motor and wherein the output shaft is coupled to the road wheel of the steering system.

Also disclosed herein in an exemplary embodiment is an active steering system with variable assist. The system comprises a motor operatively coupled to a differential actuator. The differential actuator is configured to translate motion of a hand wheel input into motion of an output shaft, wherein the motion of the output shaft is further responsive to the motor and wherein and output shaft is coupled to a road wheel of the steering system. The system also includes an assist mechanism operatively coupled to the differential actuator and the road wheel of the steering system to provide an assist torque responsive to the motion of the output shaft. The system further includes a controller in operable communication with the assist mechanism and the vehicle speed sensor, the controller generates an assist command responsive to receiving an input signal. The input signal includes at least one of a variable ratio command signal, a stability command signal, a hand wheel position signal, a vehicle speed signal indicative of a speed of the vehicle, a signal indicative of an operator selected function, and a signal indicative a vehicle operating mode.

BRIEF DESCRIPTION OF THE DRAWINGS

Referring now to the drawings wherein like elements are numbered alike in the several figures:

FIG. 3 depicts an enhancement hand wheel torque via modification of the assist command in an exemplary embodiment of an active steering system.

DETAILED DESCRIPTION OF PREFERRED EMBODIMENTS

Figure 1:
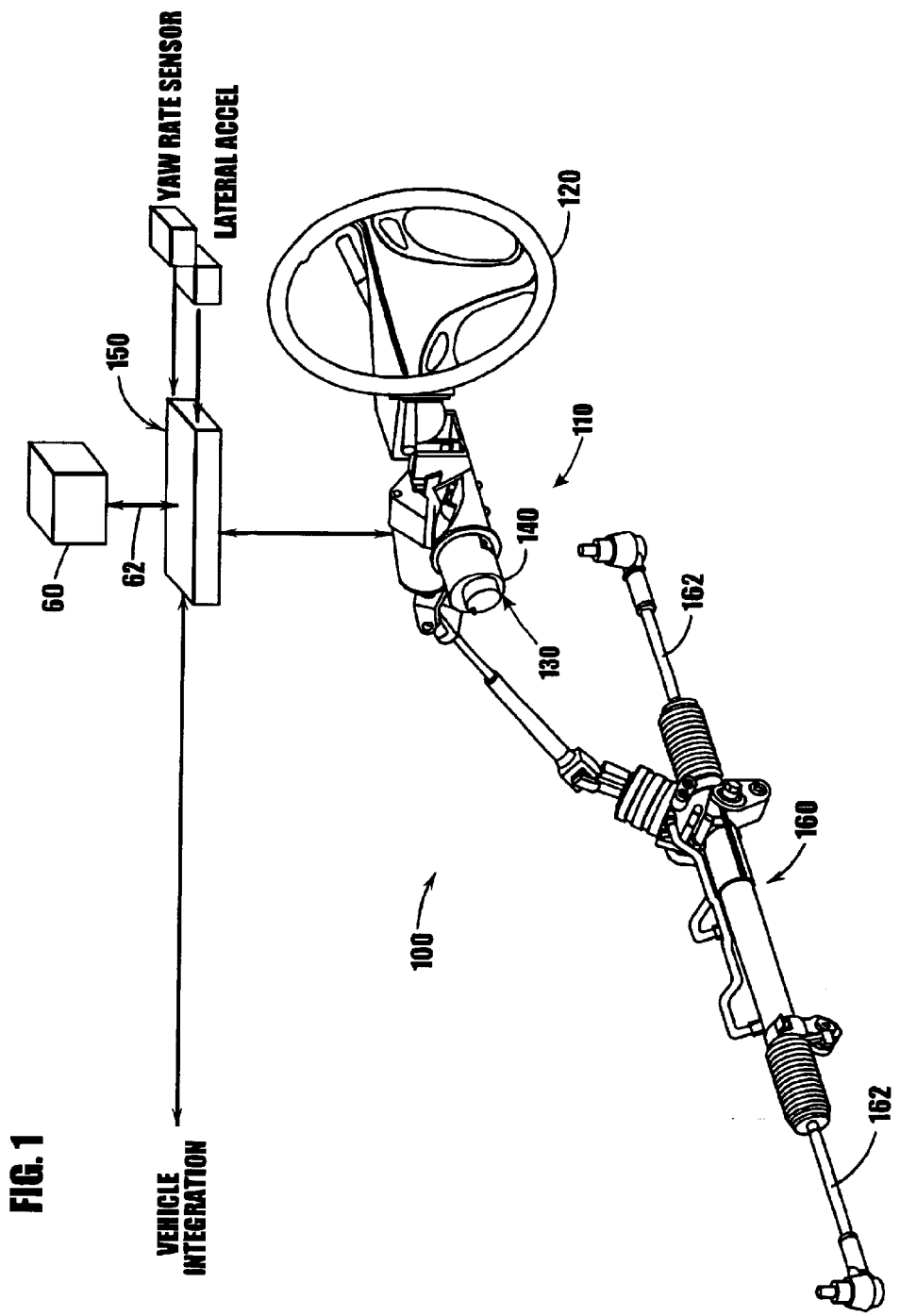
FIG. 1 shows a top level block diagram depicting an embodiment of the active steering system.

Referring now to FIG. 1, an active steering system 100 is shown and discussed. The system utilizes an electromechanical actuator, in this instance, a differential steering actuator 110, and a control unit 150 executing control algorithms, responsive to input signals including but not limited to vehicle speed, yaw and lateral acceleration sensors hand wheel position, and motor position sensors to provide both variable ratio and stability control. In an exemplary embodiment, variable ratio is a control algorithm configured to: reduce driver workload to maneuver vehicle, improve steering feel at various speeds and driving conditions, and change steering feel at all speeds based on the amount and rate of steering input. In yet another exemplary embodiment, stability is a control algorithm configured to: reduce oversteer by leading the driver with countersteer, start vehicle correction before brake-based stability system is activated reduce obtrusiveness of brake based stability systems integrate with brake-based stability systems to allow optimization of brake and steering systems to reduce stopping distances.

The active steering system 100 preferably includes, but is not limited to differential steering actuator 110, with an electric motor 140 and gear train 130. A hand wheel 120 for operator input is coupled to a mechanical input of the differential steering actuator 110 to facilitate combination with the output of the electric motor 140. Active steering system 100 further includes a control unit 150 and various sensors interfaced with the control unit 150, and operatively coupled to measure and transmit respective sensed parameters to the control unit 150.

The differential steering actuator 110 is further coupled with a power assist steering mechanism 160. The power assist mechanism transfers inputs to output shafts 162 providing a force assistance to oppose system and vehicle loads to aid an operator in achieving the desired input. The output shaft 162 is operatively connected to a steerable wheel (not shown) to direct the vehicle. It will be appreciated that while in an exemplary embodiment as disclosed herein the power assisted steering mechanism utilizes a hydraulic configuration to provide assist torque, other configurations are possible for example an electric power assist could also be employed. Such a differential steering actuator is disclosed in U.S. patent application Ser. No. 09/812,240, U.S. Patent Publication No. 2002-0029922 A1 the contents of which are incorporated by reference herein in their entirety. An illustrative configuration that employs hydraulic assist may be found in U.S. Pat. No. 4,871,040 the contents of which are incorporated by reference herein in their entirety. An illustrative electric power steering system that provides assist torque to aid the driver is disclosed in U.S. Pat. No. 5,704,446 the contents of which are incorporated by reference herein in their entirety.

It will be appreciated that while a particular mechanical configuration is described herein for the purposes of illustration, the actuator and therefore the decoupling may occur anywhere in the steering system between the hand wheel and the road wheels. An advantageous aspect of the active steering system is the "de-coupling" of the driver from the rest of the steering system while maintaining a mechanical link to the road wheels. Furthermore, using control schemes to provide either open or closed loop control based on vehicle operating parameters such as vehicle speed, yaw and lateral acceleration, and steering inputs. Such a configuration then facilitates variable ratio and stability control.

Variable ratio controls the "de-coupling" in a manner that increases or decreases the overall steering ratio. This means, for example, that instead of the steering wheel rotating +/−1.5 turns to provide max steering, the system may be programmed to provide a variety of ratios to enhance operating characteristics. For example, to reduce operator workload at low speeds, reducing steering wheel rotation to +/−0.5 turns to achieve maximum steering angle of the road wheel.

Stability control is a control scheme that once again modifies the overall steering ratio based on dynamic characteristics of the vehicle such as vehicle speed, or yaw acceleration and lateral acceleration. This is accomplished because the road wheels may now move at given rate to any given angle independent of the driver input in order to maintain the vehicle dynamic state stable. Stability control as applied to active steering systems is disclosed in copending U.S. Provisional Patent Application Ser. No. 60/385,308, Attorney Docket number DP-308199 also filed Jun. 03, 2002.

In an exemplary embodiment of an active steering system 100 applies commands to the motor 140 the reaction torque may be felt by the operator. When high rate variable ratio or stability control related commands are applied to the motor, the resulting reaction torque observed by the operator may be objectionable. Therefore, it is desirable under such conditions to tune or modify the nominally provided assist force and thereby to avoid an objectionable reaction torque being transmitted to the operator. FIG. 3 depicts a variation of hand wheel torque that may be achieved with an exemplary embodiment.

Figure 2:
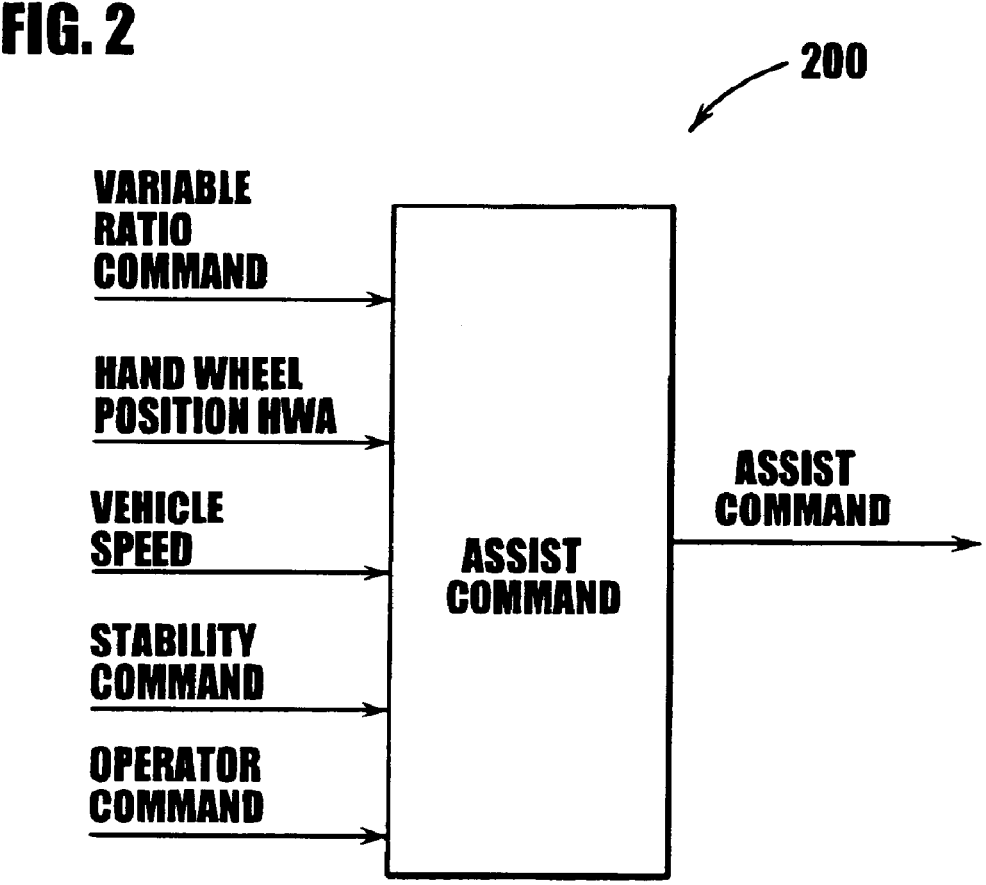
FIG. 2 depicts a block diagram of the assist command processes in an exemplary embodiment of the active steering system.

Referring now to FIG. 2, a high-level block diagram of an active steering system 100, and more specifically, the processing functions employed on the various signals sensed to determine the tunable assist torque and active steering commands to the electric motor 140. The control unit 150 may include, without limitation, a computer or processor, logic, memory, storage, registers, timing, interrupts, and the input/output signal interfaces as required to perform the processing prescribed herein. The control unit 150 preferably receives inputs from various vehicle sensors (yaw, lateral acceleration, vehicle speed, etc.), and generates output signals to control electric motor 140. For example, the control unit 150 may receive such inputs as hand wheel position, hereinafter also denoted HWA, road wheel position, hereinafter also denoted RWA, motor position MOT, yaw, lateral acceleration, vehicle speed, tire slip angle, and the like from various sensors. Alternatively, yaw may be approximated rather than sensed as taught by U.S. Pat. No. 6,205,391, issued Mar. 20, 2001, to Ghoneim et al., which is assigned to the present assignee and wholly incorporated by reference herein. Upon detecting that corrective action is required based on inputs from the various sensors, the control unit 150 preferably communicates this action to electric motor 140 to cause electric motor 140 to respond.

In an active steering system the steering position or angle of the road wheels, hereinafter also RWA is determined by response to an actuator 110 (more specifically motor 140) in addition to the inputs received from the driver. That is, the position of the road wheels is determined by the summation of the hand wheel position or angle, HWA indicative of the driver's intent and the motor position (actuator contribution). The motor position, hereinafter also MOT itself can be derived from various sources such as a motor position sensor, vehicle and/or steering signals to achieve numerous advantages. Vehicle speed is detected by a vehicle speed sensor and transmitted to the controller 150.

Uniquely, the variable ratio disclosed herein in an exemplary embodiment is configured to be variable while operating at speed and a function of multiple parameters as discussed herein below. It will be appreciated that while in the disclosure of an exemplary embodiment above the variable ratio is a function of vehicle speed and hand wheel position, other configurations and parameters are foreseeable. For example, the variable ratio may be a function of other vehicle parameters as discussed above, driver preference, direction e.g., reverse/forward, or mechanical considerations e.g., end of pinion travel, and the like, as well as combinations including at least one of the foregoing.

Referring once again to FIGS. 1 and 2 and, an exemplary embodiment of the assist command process 200 applied to active steering as might be implemented by control unit 150 is depicted. In the figure, the assist command process 200 receives or generates various signals indicative of vehicle dynamics and characteristics. For example, vehicle speed, hand wheel and motor position, yaw acceleration, and lateral acceleration, and the like. In particular, the assist command process 200 receives a variable ratio command generated as described above and a stability command similarly described above. The assist command process 200 also receives a vehicle speed signal indicative of the vehicle speed. Finally, the assist command process 200 may receive a signal indicative of hand wheel position or angle HWA and/or an operator select command indicative of an operator-desired level of assist. The assist command process 200 utilizes these signals to formulate a command to the power assist steering mechanism 160 to modify the assist torque currently provided.

The assist command process 200 evaluates the characteristics of the variable ratio command, the stability command, and the vehicle speed signal relative to selected criteria to formulate the command to the power assist steering mechanism 160. For example, in an exemplary embodiment if the variable ratio command exceeds a selected threshold, the command to the assist steering mechanism 160 is increased from a nominal value corresponding no nominal assist, to maximum value corresponding to maximum assist. Similarly, if the rate of change of the variable ratio command exceeds a selected rate threshold, the command to the power assist steering mechanism 160 is increased from a nominal value corresponding no nominal assist, to maximum value corresponding to maximum assist. Likewise, if a stability command is evident, the command to the power assist steering mechanism 160 is increased from a nominal value corresponding no nominal assist, to maximum value corresponding to maximum assist. Moreover, the command to the power assist steering mechanism 160 is scheduled as a function of the vehicle speed. For example, at low speeds the command is established at maximum value corresponding to maximum assist, while at high speeds a minimum amount of assist is provided. Additionally, the assist command may be varied as a function of hand wheel position HWA and/or an operator-selected amount of assist. For example, an operator may select a greater or lesser level of assist to suit a particular driving condition. It will be appreciated that while an exemplary embodiment is described as modifying the assist command to provide maximum or minimum assist, it is also possible to schedule the increase/decrease of the assist from nominal as desired, depending the requirements of a given implementation. The scheduling and selection criterion for an exemplary embodiment may be implemented as simple look-up tables which include scheduling as a function of vehicle speed to facilitate tuning and variability of the assist command to the power assist steering mechanism 160. It will be appreciated that while in the exemplary embodiment a simple switch selecting mechanism and look up table for scheduling are disclosed, additional configurations should now be apparent. For example, if desired, any variable as an input to the assist command process 200 may be scheduled with other variables. A simple switch and scheduling implementation has been chosen for simplicity and to facilitate implementation. Moreover, the assist provided may be tunable as a function of additional parameters and operator selected functions. For example, it may be desirable to tune the assist provide to the driver as a function of a selected operating mode. In such a configuration, a vehicle operating mode may be operator selected via an operator select signal and specifically tuned for various driving conditions such as city driving or tuned for normal or sporty driving feel, and thereby providing variable amounts of assist as desired. Moreover, separate tuning of the tables may be automatically selected in response to an operating mode signal indicative of an operating mode of the vehicle, such as, if the vehicle is in forward or reverse. During reverse operation, for example, it may be desirable to command a different amount of assist than for operation in the forward direction.

It will be evident that there exist numerous numerical methodologies in the art for implementation of mathematical functions. While many possible implementations exist, a particular method of implementation should not be considered limiting. It will be further be appreciated that while the disclosed embodiments refer in several instances, to a configuration utilizing look-up tables in implementation, such a reference is illustrative only and not limiting. Various alternatives will be apparent to those skilled in the art. For example, the processes and algorithms described above could employ, in addition to, or in lieu of, look-up tables, direct algorithms, gain or parameter scheduling, linearized interpolation or extrapolation, and/or various other methodologies, which may facilitate execution of the desired functions and the like, as well as combinations thereof. It should further be noted that the particular configurations of the lookup table(s) are once again, illustrative only, a variety of other configurations or element allocations are feasible.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium 60, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal 62 transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the description has been made with reference to exemplary embodiments, it will be understood by those of ordinary skill in the pertinent art that various changes may be made and equivalents may be substituted for the elements thereof without departing from the scope of the disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. An active steering system with variable assist comprising:

a motor operatively coupled to a differential actuator; said differential actuator configured to translate motion of a hand wheel input into motion of an output shaft, wherein said motion of said output shaft is further responsive to said motor and wherein said output shaft is coupled to a road wheel of said steering system;

an assist mechanism operatively coupled to said differential actuator and said road wheel of said steering system to provide an assist torque responsive to said motion of said output shaft;

a controller in operable communication with said assist mechanism, said motor, and vehicle speed sensor, said controller generating an assist command responsive to an input signal, said input signal including at least one of a variable ratio command signal, a stability command signal, a hand wheel position signal, a vehicle speed signal indicative of a speed of said vehicle, a signal indicative of an operator selected function, and a signal indicative a vehicle operating mode.

2. The system of claim 1 wherein said assist command is responsive to at least one of said variable ratio command signal, said stability command signal, said hand wheel position signal, said vehicle speed signal, and an operator select command.

3. The system of claim 2 wherein said assist command is increased when said variable ratio command signal exceeds a selected threshold.

4. The system of claim 2 wherein said assist command is increased when a rate of change of said variable ratio command signal exceeds a selected threshold.

5. The system of claim 2 wherein said assist command is a increased when said stability command signal exceeds a selected threshold.

6. The system of claim 2 wherein said assist command is scheduled as a function of said input signal.

7. The system of claim 6 wherein said scheduled comprises a look-up table responsive to said input signal.

8. The system of claim 6 wherein said assist command is scheduled as a function of said vehicle speed signal.

9. The system of claim 2 wherein said assist command is scheduled as a function of said signal indicative of an operator selected function.

10. The system of claim 2 wherein said assist command is scheduled as a function of said signal indicative of a vehicle operating mode.

11. A method for providing variable assist in an active steering system of a vehicle comprising:

receiving an input signal, said input signal including at least one of a variable ratio command signal, a stability command signal, a hand-wheel position signal, a vehicle speed signal indicative of a speed of said vehicle, a signal indicative of an operator selected function, and a signal indicative vehicle operating mode;

generating an assist command to an assist mechanism responsive to said input signal, wherein said assist mechanism is operatively coupled to said differential actuator and a road wheel of said steering system to provide assist torque responsive to said motion of said output shaft; and wherein said active steering system includes a hand wheel operatively coupled to an input of a differential actuator and a motor operatively coupled to said differential actuator; said differential actuator configured translate motion of said input into motion of said output shaft, wherein said motion of said output shaft is further responsive to said motor and wherein said output shaft is coupled to said road wheel of said steering system.

12. The method of claim 11 wherein said assist command is responsive to at least one of said variable ratio command signal, said stability command signal, said hand wheel position, said vehicle speed signal and said operator selected function.

13. The method of claim 12 wherein said assist command is increased when said variable ratio command signal exceeds a selected threshold.

14. The method of claim 12 wherein said assist command is increased when a rate of change of said variable ratio command signal exceeds a selected threshold.

15. The method of claim 12 wherein said assist command is increased when said stability command signal exceeds a selected threshold.

16. The method of claim 12 wherein said assist command is scheduled as a function of said input signal.

17. The method of claim 16 wherein said scheduled comprises a look-up table responsive to said input signal.

18. The method of claim 16 wherein said assist command is scheduled as a function of said vehicle speed signal.

19. The method of claim 12 wherein said assist command is scheduled as a function of said signal indicative of an operator selected function.

20. The method of claim 12 wherein said assist command is scheduled as a function of said signal indicative to a vehicle operating mode.

* * * * *

UNITED STATES PATENT AND TRADEMARK OFFICE
CERTIFICATE OF CORRECTION

PATENT NO. : 6,926,114 B2
DATED : August 9, 2005
INVENTOR(S) : Bolourchi et al.

It is certified that error appears in the above-identified patent and that said Letters Patent is hereby corrected as shown below:

Title page,
Item [75], Inventors, delete "Bednar" and insert therefor -- Bedner --.

Signed and Sealed this

Sixth Day of December, 2005

JON W. DUDAS
*Director of the United States Patent and Trademark Office*